Patented Dec. 22, 1942

2,306,016

UNITED STATES PATENT OFFICE 2,306,016

ANTISKINNING AGENT

Michael A. Eitelman, Hamburg, N. Y., assignor to Allied Chemical & Dye Corporation, a corporation of New York No Drawing. Application January 26, 1940, Serial No. 315,752

22 Claims. (Cl. 106—218)

This invention relates to coating compositions.

Many types of air-hardenable coating compositions, such as paints, varnishes, enamels, and lacquers, when exposed in bulk to air either in open or closed containers, tend to develop tough, rubber-like skins over or near exposed surfaces or to become thick or livery, and no amount of stirring will serve to restore their normal homogeneous character. It is obvious that this capacity for becoming heterogeneous, hereinafter referred to as "skinning," is not merely the result of gravitational separation of constituents, such as results when a heavy pigment settles in a lighter vehicle, but is chemical in nature. Skinning is generally attributed to oxidation or to polymerization in the presence of oxygen of certain constituents, such as drying oils or resins, (vehicular constituents of paints and enamels) which give to the compositions their ability to "air-harden" and thus to form durable coatings. Since this property of air-hardening is necessary for the normal uses of such compositions, it is apparent that efforts to eliminate so-called skinning and related phenomena must at the same time avoid an objectionable loss of the air-hardening properties of the composition in film form.

It is known that many organic compounds, when present in such coating compositions, prevent or at least inhibit the skinning previously referred to, and materials which inhibit these effects will be referred to herein as "antiskinning agents." However, if the previously known antiskinning agents are added in proportions much above those required to develop their antiskinning properties, they tend to prolong or prevent air-hardening of the compositions in film form. The allowable concentrations differ according to the nature of the coating compositions. The maximum concentration suitable for one type of composition may be too large for another and may retard drying of the latter to an objectionable degree. On the other hand, the minimum concentration suitable for one coating composition may be inadequate to prevent development of skinning effects in another. The maximum concentrations employable with such agents are not over about 0.2 gram of antiskinning agent per 100 ccs. of coating composition.

In view of the lack of uniformity of results obtainable with antiskinning agents which have been known heretofore, it is necessary to conduct tests of each antiskinning agent to determine both its effect on the coating composition in bulk form and its effect on the composition in film form, and to carefully control the proportions to be added on the basis of such tests. Such accurate control is highly inconvenient, but the only alternative has been the production of products exhibiting serious skinning effects or products of widely variant and unpredictable skinning and air-hardening properties. Greater latitude in the permissible proportions of antiskinning agent which may be used to advantage in coating compositions is much to be desired in order to eliminate the rigid control necessary with previously used antiskinning agents and to provide a greater degree of predictability of the properties of compositions resulting from addition of an antiskinning agent to coating compositions of known properties.

It is an object of the present invention to provide new antiskinning agents and particularly antiskinning agents which, when present in very low concentrations, have the property of inhibiting skinning or loss of the normal homogeneous character of air-hardenable coating compositions, but which, even when present in much higher concentrations, do not adversely affect the drying of such compositions in film form.

Further objects will be apparent from the description of the invention and its applications as set forth more fully hereinafter.

According to the present invention, an air-hardenable coating composition normally subject to skinning is modified, in order to inhibit the objectionable property, by the addition thereto of an organic anti-oxidant, especially an anti-oxidant of the aliphatic series, which boils below 160° C. According to the present invention the preferred group of antiskinning agents comprises either aliphatic or aromatic-aliphatic substitution derivatives of hydroxylamine. However such derivatives boiling above 160° C. also may be employed as antiskinning agents within the purview of the present invention.

Substitution derivatives of hydroxylamine which are especially suitable for the purposes of this invention may be represented by the general formula $R=N-O-R'$, R representing a member of the group consisting of alkylidene and aralkylidene radicals and R' representing a member of the group consisting of hydrogen, alkyl, and aralkyl radicals.

The especially preferred antiskinning agents of the invention are oximes which contain at least two and not more than six carbon atoms in the molecule.

The use of the aforesaid antiskinning agents which boil below 160° C. is particularly advantageous in the case of rapid-drying, oily, air-hardening, coating compositions, in particular, those which contain metal compounds, e. g., Japan driers, siccatives, pigments, etc. The term "rapid-drying," with reference to coating compositions, is used herein to designate compositions such as household varnishes and lacquers which dry in less than 24 hours, for example, 4-hour enamel. In such compositions the said anti-skinning agents of the present invention effectively inhibit skinning of the composition during application and storage, do not materially retard the drying thereof after application, and do not form relatively non-volatile anti-oxidant materials in effective amounts as a result of contact with the air and/or with the other ingredients of the coating composition.

Normally a wide latitude is permissible in the proportions of the antiskinning agent which may be used. Effective proportions vary from as little as 0.2 gram up to 2 grams of antiskinning agent per 100 cubic centimeters of coating composition, without retarding film drying. This broad range is particularly applicable to the preferred antiskinning agents. It is to be understood, however, that my invention contemplates, in a broad sense, the use of the antiskinning agents thereof whether or not they alter the film drying rate since in many cases retarded drying is not objectionable and in some cases may be desirable.

The following substitution derivatives of hydroxylamine, which are named according to the "Definitive report of the Commission on the Reform of the Nomenclature of Organic Chemistry," 55, Journal American Chemical Society, 3905 (1933), are specific examples of antiskinning agents within the purview of the present invention:

Ethanol oxime (acetaldoxime)
Propanal oxime
Butanal oxide (butyraldoxime)
2-methyl propanal oxime (isobutyraldoxime
2-methyl butanal oxime
3-methyl butanal oxime
4-methyl pentanal oxime (isohexanoxime)
Hexanal oxime
Propanone oxime (acetoxime)
Butanone oxime
3-methyl-2-butanone oxime
2-pentanone oxime
3-pentanone oxime
Methanal oxime (formoxime)
Phenyl methanal oxime (benzaldoxime)
Methyl hydroxylamine
Ethyl hydroxylamine
Dimethyl hydroxylamine
Diethyl hydroxylamine
Methoxy amine
N-methyl-methoxy amine
3-methyl-2-pentanone oxime
2-hexanone oxime
2-methyl-3-pentanone oxime
N-ethyl methoxyamine
N-ethyl ethoxyamine
N-ethyl propoxyamine
O-methyl propanone oxime
O-ethyl propanone oxime
O-propyl propanone oxime
O-methyl butanone oxime To demonstrate the antiskinning effects of the antiskinning agents of the present invention upon coating compositions, the results of several tests are tabulated below in Table 1. In the tests several materials were tested in a commercial "4-hour" enamel and a commercial "quick drying" flat varnish in the following manner.

20 cc. portions of the enamel were placed in 6" x ¾" test tubes. One such portion was reserved as a control. To each of the several of these portions of enamel a measured amount of a toluene solution of known concentration of the antiskinning agent to be tested (e. g., a toluene solution containing 5 grams agent per 100 ccs. of solution) was added. To one portion of the enamel, serving as an additional control, toluene alone was added in a quantity equal to the amount which was introduced into the aforesaid test portions of enamel by the added solutions of antiskinning agents. The contents of each test tube were thoroughly and quickly mixed. The tubes were stoppered lightly in a manner to prevent circulation of air above the tube contents, but not to prevent such "breathing" as might be caused by changes of temperature in the tubes or in the vicinity of the tubes or by absorption of constituents (for example, oxygen) from the air in the tubes. The tubes were examined daily. A skin on the surface of the composition was considered to have formed when it had sufficient tensile strength to support the composition as the tube under examination was slowly and completely inverted. The intervals of time required for such skins to form in the several compositions in the tubes were noted and compared. The times required for skins to form on the undiluted composition and on the composition diluted with toluene alone served as controls and indexes for discounting effects due solely to dilution caused by the toluene.

Similar tests are made with a commercial varnish but the antiskinning agents were added thereto directly and not as solutions in toluene.

*Table 1*

| Antiskinning agent added | Amount of agent | Amount of toluene | Time required for development of skin |
|---|---|---|---|
| ENAMEL TESTS | | | |
| | *Grams* | *Cc.* | |
| None | | 0 | Less than 24 hours. |
| Do | | 2 | Do. |
| Ethanal oxime | 0.10 | 2 | More than 5 months. |
| Propanal oxime | 0.10 | 2 | 9 days. |
| VARNISH TESTS | | | |
| None | | 0 | Less than 24 hours. |
| Ethanal oxime | 0.10 | 0 | More than 3 months. |
| Butanal oxime | 0.10 | 0 | Do. |
| Propanone oxime | 0.10 | 0 | Do. |
| Butanone oxime | 0.10 | 0 | 3 days. |

In connection with the above tests the effects upon drying time of the several materials tested at the concentrations used in the tests were determined. In no case was the drying time substantially increased.

It has been found that air-hardenable coating compositions will tolerate relatively large additions of the low-boiling antiskinning agents of this invention before the drying rate of the treated compositions is materially retarded. The relatively wide range of proportions between the minimum effective proportion of antiskinning agent in the coating composition and the maximum proportion which will not hinder drying is exemplified in Table 2 below.

A commercial quick-drying flat varnish was treated with the several antiskinning agents shown in the following table in amounts ranging up to about 2 grams of agent per 100 ccs. of varnish. The treated samples were placed in test tubes and examined in the manner described above in connection with Table 1. The minimum quantities of the several antiskinning agents which upon addition prevented skinning within twenty-four hours, were noted. Simultaneously, the drying rates of films of the treated compositions were noted. The maximum amount of antiskinning agent which was added did not retard drying of films in any case involving the preferred antiskinning agents of this invention. In the tabulation of results below, designated as Table 2, the minimum addition of antiskinning agent which prevented skinning for twenty-four hours is given in grams per 100 ccs. in the column headed "minimum."

Table 2

| Antiskinning agent added | Boiling range of agent | Minimum |
|---|---|---|
| | °C. | Grams |
| Ethanal oxime | 111–115 | 0.3 |
| Propanone oxime | 133–136 | 0.4 |
| Butanone oxime | 147–148 | 0.5 |
| Butanal oxime | 148–156 | 0.4 |

The desirable characteristics of the skinning agents of the invention also may be illustrated by comparing the effect of concentration upon skinning time and film drying time as illustrated by Table 3 below.

Uniform, equal portions of a commercial enamel (Valspar Jonquil Yellow Enamel) were mixed with appropriate amounts of alpha methyl hydroxylamine ($CH_3O \cdot NH_2$, boiling point 49°–50° C.) and tested for drying times and skinning times in the manner described in connection with Table 2. The results obtained are set forth in the following table, and show that the anti-oxidant in concentrations as low as ½ gram per 100 ccs. and as high as 2 grams per 100 ccs. substantially inhibited skinning without affecting the film drying qualities of the enamel.

Table 3

| Test No. | Grams of $CH_3O \cdot NH_2$ in 100 cc. of composition | Skinning time | Drying time |
|---|---|---|---|
| | | | Hours |
| 1 | 0 | Less than 24 hours | 4 |
| 2 | 0.5 | No skin in 6 days | 4 |
| 3 | 1.0 | do | 4 |
| 4 | 2.0 | do | 4 |

The expression "tends to deteriorate by the absorption of oxygen from the air" is used in the claims to mean the tendency of coating compositions when exposed in bulk to air, either in open or closed containers, to lose their homogeneous character and develop skins over or near exposed surfaces or to become thick or livery.

I claim:

1. The method of preserving drying oil compositions which tend to deteriorate by the absorption of oxygen from the air which comprises adding to it an organic compound containing the bivalent oximido group.

2. The method of preserving drying oil compositions which tend to deteriorate by the absorption of oxygen from the air which comprises adding to it an organic compound represented by the formula $RR'C=NOH$ in which R is one of the group consisting of an alkyl, aryl and aralkyl radical and R' is one of the group consisting of hydrogen and alkyl, aryl and aralkyl radicals.

3. The method of preserving drying oil compositions which tend to deteriorate by the absorption of oxygen from the air which comprises adding to it an aliphatic aldoxime.

4. A coating composition containing a drying oil, a positive oxidation catalyst and, as a negative oxidation catalyst, an organic aldoxime in sufficient quantity to substantially prevent oxidation of the composition in the packaged state without materially retarding the normal drying rate of the composition when exposed in a thin film state to the normal atmosphere.

5. A method for preventing the formation of scum or skin on the surface of a packaged drying oil composition which comprises incorporating in the composition an organic aldoxime.

6. The method of preventing skinning of an air-hardenable coating composition containing a substance from the group consisting of drying oils and resins, which composition tends to deteriorate by the absorption of oxygen from the air, which method comprises adding an oxime to the coating composition.

7. An air-hardenable coating composition containing a substance from the group consisting of drying oils and resins, which coating composition tends to deteriorate by the absorption of oxygen from the air, said coating composition having an oxime incorporated therein to prevent skinning thereof.

8. An air-hardenable coating composition containing a substance from the group consisting of drying oils and resins, which coating composition tends to deteriorate by the absorption of oxygen from the air, said coating composition having incorporated therein a compound of the group consisting of aliphatic and aromatic-aliphatic substitution derivatives of hydroxylamine to prevent skinning thereof.

9. An air-hardenable coating composition containing a substance from the group consisting of drying oils and resins, which coating composition tends to deteriorate by the absorption of oxygen from the air, said coating composition having incorporated therein a compound of the formula $R=N-O-R'$, R representing a member of the group consisting of alkylidene and aralkylidene radicals and R' representing a member of the group consisting of hydrogen, alkyl, and aralkyl radicals, to prevent skinning thereof.

10. An air-hardenable coating composition containing a substance from the group consisting of drying oils and resins, which coating composition tends to deteriorate by the absorption of oxygen from the air, said coating composition having incorporated therein from .2 to 2 grams of an oxime containing at least 2 but not more than 6 carbon atoms per 100 ccs. of coating composition to prevent skinning of the coating composition.

11. An air-hardenable coating composition containing a substance from the group consisting of drying oils and resins, which coating composition tends to deteriorate by the absorption of oxygen from the air, said coating composition having incorporated therein a compound characterized by a boiling point not higher than 160° C. and by the general formula: $R=N-O-R'$, R representing a member of the group consisting of alkylidene and aralkylidene radicals and R' representing a member of the group consisting of hydrogen, alkyl, and aralkyl radicals, to prevent skinning thereof.

12. An air-hardenable coating composition containing a substance from the group consisting of drying oils and resins, which coating composition tends to deteriorate by the absorption of oxygen from the air, said coating composition having incorporated therein ethanol oxime to prevent skinning thereof.

13. An air-hardenable coating composition containing a substance from the group consisting of drying oils and resins, which coating composition tends to deteriorate by the absorption of oxygen from the air, said coating composition having incorporated therein propanone oxime to prevent skinning thereof.

14. An air-hardenable coating composition containing a substance from the group consisting of drying oils and resins, which coating composition tends to deteriorate by the absorption of oxygen from the air, said coating composition having incorporated therein butanal oxime to prevent skinning thereof.

15. An air-hardenable coating composition containing a drying oil, a dryer and, as an antiskinning agent, an oxime boiling not higher than 160° C. in sufficient quantity to substantially prevent skinning of the coating composition in the packaged state without materially retarding the normal drying rate of the coating composition when exposed in a thin film state to a normal atmosphere.

16. The method of preventing skinning of an air-hardenable coating composition containing a substance from the group consisting of drying oils and resins, which composition tends to deteriorate by the absorption of oxygen from the air, which method comprises adding a compound of the group consisting of aliphatic and aromatic-aliphatic substitution derivatives of hydroxylamine to the coating composition.

17. The method of preventing skinning of an air-hardenable coating composition containing a substance from the group consisting of drying oils and resins, which composition tends to deteriorate by the absorption of oxygen from the air, which method comprises adding a compound of the formula $R=N-O-R'$, R representing a member of the group consisting of alkylidene and aralkylidene radicals and R' representing a member of the group consisting of hydrogen, alkyl, and aralkyl radicals, to the coating composition.

18. The method of preventing skinning of an air-hardenable coating composition containing a substance from the group consisting of drying oils and resins, which composition tends to deteriorate by the absorption of oxygen from the air, which method comprises adding an oxime containing at least 2 but not more than 6 carbon atoms to the coating composition.

19. The method of preventing skinning of an air-hardenable coating composition containing a substance from the group consisting of drying oils and resins, which composition tends to deteriorate by the absorption of oxygen from the air, which method comprises adding a compound characterized by a boiling point not higher than 160° C. and by the general formula:

$$R=N-O-R',$$

R representing a member of the group consisting of alkylidene and aralkylidene radicals and R' representing a member of the group consisting of hydrogen, alkyl, and aralkyl radicals, to the coating composition.

20. The method of preventing skinning of an air-hardenable coating composition containing a substance from the group consisting of drying oils and resins, which composition tends to deteriorate by the absorption of oxygen from the air, which method comprises adding ethanal oxime to the coating composition.

21. The method of preventing skinning of an air-hardenable coating composition containing a substance from the group consisting of drying oils and resins, which composition tends to deteriorate by the absorption of oxygen from the air, which method comprises adding propanone oxime to the coating composition.

22. The method of preventing skinning of an air-hardenable coating composition containing a substance from the group consisting of drying oils and resins, which composition tends to deteriorate by the absorption of oxygen from the air, which method comprises adding butanal oxime to the coating composition in amount sufficient to prevent skinning but insufficient to materially alter the film drying rate of the composition.

MICHAEL A. EITELMAN.